(12) United States Patent
Patil et al.

(10) Patent No.: US 8,503,481 B2
(45) Date of Patent: Aug. 6, 2013

(54) PROCESSING EXTENSION TYPE SYSTEM INFORMATION BLOCKS (SIBS)

(75) Inventors: Kiran KishanRao Patil, Hyderabad (IN); Deepti Mani, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 13/171,347

(22) Filed: Jun. 28, 2011

(65) Prior Publication Data

US 2012/0170515 A1 Jul. 5, 2012

Related U.S. Application Data

(60) Provisional application No. 61/359,418, filed on Jun. 29, 2010.

(51) Int. Cl.
*H04J 3/24* (2006.01)
(52) U.S. Cl.
USPC .......................................... 370/474; 370/476
(58) Field of Classification Search
USPC ................. 370/473, 476, 471, 349, 321, 337, 370/347
See application file for complete search history.

(56) References Cited

U.S. PATENT DOCUMENTS

2007/0049344 A1  3/2007  Van Der Velde et al.
2007/0260851 A1* 11/2007  Taha et al. .................... 712/204
2008/0182577 A1*  7/2008  Ng et al. .................... 455/435.2
2008/0267309 A1  10/2008  Saini et al.
2009/0245211 A1* 10/2009  Kim et al. .................... 370/336
2010/0227569 A1  9/2010  Bala et al.
2010/0296504 A1  11/2010  Zhu et al.

FOREIGN PATENT DOCUMENTS

WO  WO2011025772 A1  3/2011

OTHER PUBLICATIONS

International Search Report and Written Opinion—PCT/US2011/042433, ISA/EPO—Oct. 24, 2011.
Nokia Corporation et al., "Correction to SIB Type extension handling", 3GPP Draft; 25331_CR_(REL-8)_R2-100567 Sibubis, 3rd Generation Partnership Project (3GPP), Mobile Competence Centre 650, Route Des Lucioles ; F-06921 Sophia-Antipolis Cedex ; France, vol. RAN WG2, no. Valencia, Spain; 20100118, Jan. 11, 2010, XP050420791, [retrieved on Jan. 11, 2010].
3GPP TS 25.331 v8.10.0 (Mar. 2010), 3rd Generation Partnership Project; Technical Specification Group Radio Access Netwok; Radio Resource Control (RRC); Protocol specification (Release 8).

* cited by examiner

*Primary Examiner* — Brenda H Pham
(74) *Attorney, Agent, or Firm* — Kevin T. Cheatham

(57) ABSTRACT

A method for determining an extension type of a system information block segment is described. A system information block segment of type extension is received in a system frame number. A byte in a system information block extension type lookup table corresponding to the system frame number of the system information block segment is calculated. A bit position in the system information block extension type lookup table corresponding to the system frame number is calculated. The extension type expected at the system frame number for the system information block segment is determined using the byte and the bit position.

32 Claims, 10 Drawing Sheets

PROCESSING EXTENSION TYPE SYSTEM INFORMATION BLOCKS (SIBS)

RELATED APPLICATIONS

This application is related to and claims priority from U.S. Provisional Patent Application Ser. No. 61/359,418, filed Jun. 29, 2010, for "RECEIVING AND PROCESSING OR EXTENSION SYSTEM INFORMATION BLOCKS IN HSPA+ USER EQUIPMENT."

TECHNICAL FIELD

The present disclosure relates generally to wireless communication systems. More specifically, the present disclosure relates to systems and methods for processing extension type system information blocks (SIBs).

BACKGROUND

Wireless communication systems are widely deployed to provide various types of communication content such as voice, video, data, and so on. These systems may be multiple-access systems capable of supporting simultaneous communication of multiple terminals with one or more base stations.

A terminal may be battery operated. As such, it may be desirable to minimize the battery consumption of the terminal. One such way to reduce the battery consumption is to reduce computations performed by the terminal that are ambiguous. By reducing these computations, the terminal may spend less time in processing data and more time in low power consumption modes. Furthermore, reducing the complexity of the computations performed on the terminal may reduce the cost of producing a terminal.

When a terminal camps on a cell, the terminal may receive system information blocks (SIBs) that instruct the terminal. Benefits may be realized by improved methods for receiving and decoding these system information blocks (SIBs).

SUMMARY

A method for determining an extension type of a system information block segment is described. A system information block segment of type extension is received in a system frame number. A byte in a system information block extension type lookup table corresponding to the system frame number of the system information block segment is calculated. A bit position in the system information block extension type lookup table corresponding to the system frame number is also calculated. The extension type expected at the system frame number for the system information block segment is determined using the byte and the bit position.

Bit content may correspond to the byte and the bit position. Determining the extension type expected using the byte and the bit position may include determining the extension type corresponding to the bit content in a bit content to system information block extension type mapping. The system information block extension type lookup table may be initialized to all zeroes. Scheduling information may be received. Bits in the system information block extension type lookup table may be filled in for each system frame number of the scheduling information. The scheduling information may be one of a master information block and a scheduling block.

The system information block extension type lookup table may be a reduced memory system information block extension type lookup table. Only bits in the reduced memory system information block extension type lookup table for system frame numbers in the range 0 to maxRepInterval−1 may be filled. The method may be performed by a user equipment. The user equipment (UE) may operate in an Evolved High-Speed Packet Access environment. The system information block segment may be a broadcast control channel-broadcast channel system information block segment.

The method may reduce the time used to process the system information block of type extension. The method may also reduce the million instructions per second used to process the system information block of type extension. It may be determined whether a sfn_prime of the system information block segment is equal to a scheduled system frame number. The sfn_prime of the system information block segment may be equal to the scheduled system frame number. The system information block segment may then be processed. If the sfn_prime of the system information block segment is not equal to the scheduled system frame number, the system information block segment may be discarded and a new system information block segment may be waited for.

A wireless device configured for determining an extension type of a system information block segment is also described. The wireless device includes a processor, memory in electronic communication with the processor and instructions stored in the memory. The instructions are executable by the processor to receive a system information block segment of type extension in a system frame number. The instructions are also executable by the processor to calculate a byte in a system information block extension type lookup table corresponding to the system frame number of the system information block segment. The instructions are further executable to calculate a bit position in the system information block extension type lookup table corresponding to the system frame number. The instructions are also executable to determine the extension type expected at the system frame number for the system information block segment using the byte and the bit position.

A wireless device configured for determining an extension type of a system information block segment is described. The wireless device includes means for receiving a system information block segment of type extension in a system frame number. The wireless device also includes means for calculating a byte in a system information block extension type lookup table corresponding to the system frame number of the system information block segment. The wireless device further includes means for calculating a bit position in the system information block extension type lookup table corresponding to the system frame number. The wireless device also includes means for determining the extension type expected at the system frame number for the system information block segment using the byte and the bit position.

A computer-program product for determining an extension type of a system information block segment is also described. The computer-program product is a non-transitory computer-readable medium having instructions thereon. The instructions include code for causing a user equipment to receive a system information block segment of type extension in a system frame number. The instructions also include code for causing the user equipment to calculate a byte in a system information block extension type lookup table corresponding to the system frame number of the system information block segment. The instructions further include code for causing the user equipment to calculate a bit position in the system information block extension type lookup table corresponding to the system frame number. The instructions also include code for causing the user equipment to determine the extension type expected at the system frame number for the system information block segment using the byte and the bit position.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. The 3GPP may define specifications for the next generation of mobile networks, mobile systems and mobile devices. In 3GPP, a mobile station or device may be referred to as a "user equipment" (UE).

Figure 1:
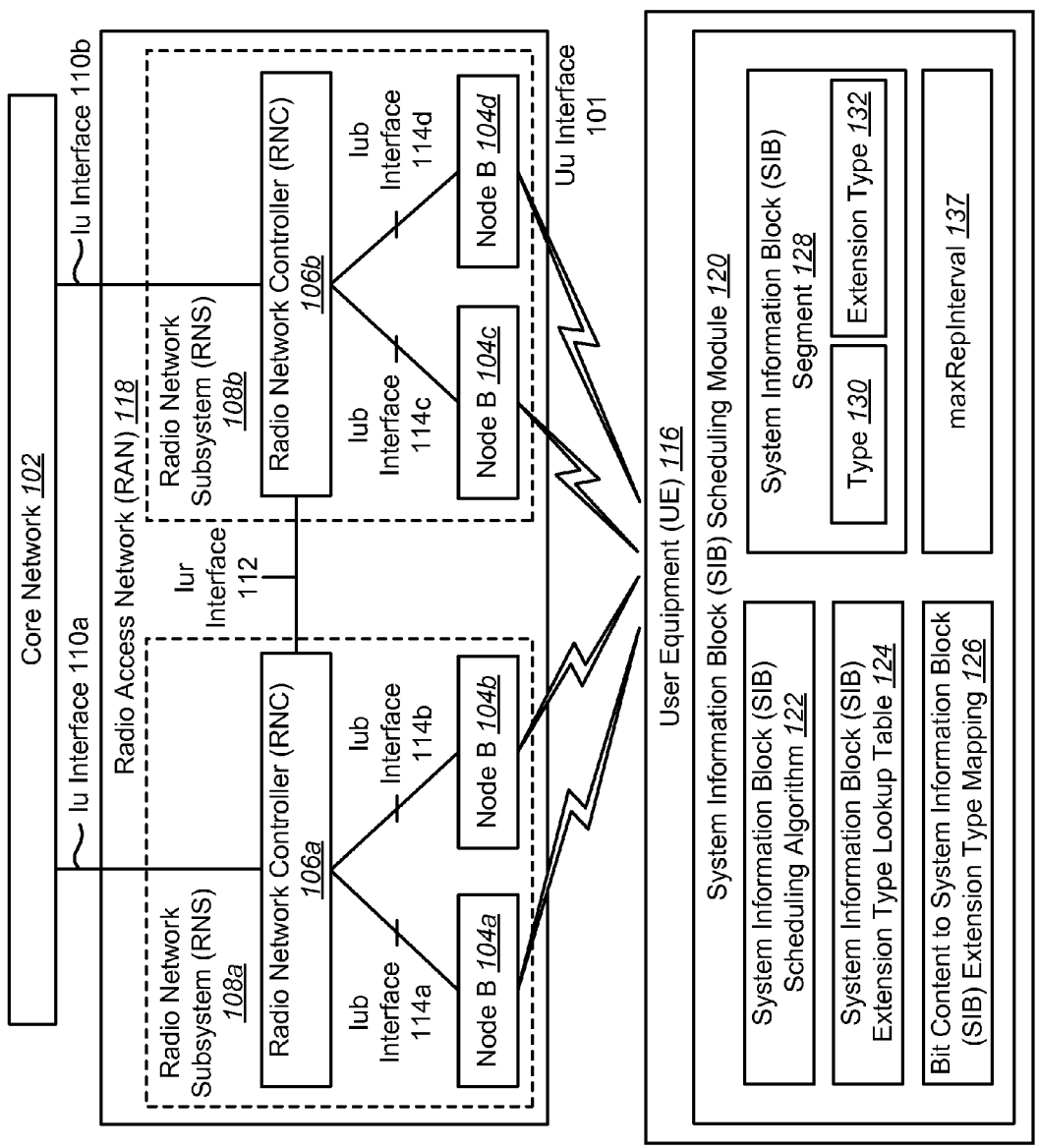
FIG. 1 shows a wireless communication system with multiple wireless devices.

FIG. 1 shows a wireless communication system 100 with multiple wireless devices. Wireless communication systems 100 are widely deployed to provide various types of communication content such as voice, data, and so on. A wireless device may be a Node B 104a-d or a user equipment (UE) 116. A Node B 104 is a station that communicates with one or more user equipments (UEs) 116. A Node B 104 may also be referred to as, and may include some or all of the functionality of, an access point, a broadcast transmitter, a base station, an evolved Node B, etc.

A user equipment (UE) 116 may also be referred to as, and may include some or all of the functionality of, a terminal, an access terminal, a wireless communication device, a subscriber unit, a station, etc. A user equipment (UE) 116 may be a cellular phone, a personal digital assistant (PDA), a wireless device, a wireless modem, a handheld device, a laptop computer, etc.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO and MISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system 100 may be a multiple-access system capable of supporting communication with multiple user equipments (UEs) 116 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The wireless communication system 100 may include a radio access network (RAN) 118 operating according to Universal Mobile Telecommunications System (UMTS). A radio access network (RAN) 118 may include one or more radio network subsystems (RNS) 108a-b. Each radio network subsystem (RNS) 108 may include one or more Node Bs 104 and one or more radio network controllers (RNCs) 106a-b. A radio access network (RAN) 118 may also be referred to as a "radio network" or an "access network." The radio access network (RAN) 118 may be a UMTS Terrestrial Radio Access Network (UTRAN). A UMTS Terrestrial Radio Access Network (UTRAN) is a collective term for the Node Bs 104 and the control equipment for the Node Bs 104 (or radio network controllers (RNCs) 106a-b) it contains which make up the UMTS radio access network (RAN) 118. This is a third generation (3G) communications network which can carry both real-time circuit switched and internet protocol (IP) based packet switched traffic types. The UTRAN provides an air interface access method for the user equipment (UE) 116. Connectivity is provided between the user equipment (UE) 116 and a core network 102 by the UTRAN. The radio access network (RAN) 118 may transport data packets between multiple user equipments (UEs) 116.

The UTRAN may be connected internally or externally using four interfaces: the Iu interface 110a-b, the Uu interface 101, the Iub interface 114a-d and the Iur interface 112. The UTRAN may be attached to a Global System for Mobile Communications (GSM) core network 102 via an external interface referred to as the Iu interface 110. One or more radio network controllers (RNCs) 106 may support the Iu interface 110. In addition, a radio network controller (RNC) 106 may manage a set of base stations called Node Bs 104 through the Iub interfaces 114. The Iur interface 112 may connect two radio network controllers (RNCs) 106 with each other. The UTRAN is largely autonomous from the core network 102 since the radio network controllers (RNCs) 106 are interconnected by the Iur interface 112. The Uu interface 101 also connects the Node B 104 with a user equipment (UE) 116, while the Iub interface 114 is an internal interface that connects the radio network controller (RNC) 106 with the Node B 104.

The radio access network (RAN) 118 may be further connected to additional networks outside the radio access network (RAN) 118, such as a corporate intranet, the Internet or a conventional public switched telephone network (PSTN) and may transport data packets between each user equipment (UE) 116 and the outside networks.

The wireless communication system 100 may utilize Evolved High-Speed Packet Access (HSPA+). Evolved High- Speed Packet Access (HSPA+) is a wireless broadband standard defined in 3GPP Release 7 and above. Evolved High-Speed Packet Access (HSPA+) uses multiple-input and multiple-output (MIMO) along with higher order modulation (e.g., 16 quadrature amplitude modulation (QAM)) to increase capacity.

A user equipment (UE) 116 may include a system information block (SIB) scheduling module 120. The user equipment (UE) 116 may receive system information block (SIB) segments 128 from a Node B 104. Each system information block (SIB) segment 128 may include a type 130. Most types 130 of system information block (SIB) segments 128 use a one-to-one mapping. However, when the type 130 of a system information block (SIB) segment 128 is Extension, the system information block (SIB) segment 128 may include a one-to-many mapping to different extension types 132. There are currently 11 possible extension types 132, although more may be used. A system information block (SIB) segment 128 of type 130 extension may map to one of the extension types 132. The current 3GPP standard specification does not specify how the user equipment (UE) 116 should process system information block (SIB) segments 128 that are an extension type 132.

The user equipment (UE) 116 may use the system information block (SIB) scheduling module 120 to determine the extension type 132 of a system information block (SIB) segment 128. The system information block (SIB) scheduling module 120 may use a system information block (SIB) scheduling algorithm 122 to sort through the received system information block (SIB) segments 128. Because of the many different extension types 132, the system information block (SIB) scheduling algorithm 122 may need to be iteratively run. However, this can reduce the efficiency of a user equipment (UE) 116 (i.e., cause a longer running time). Instead, the user equipment (UE) 116 may include a system information block (SIB) extension type lookup table 124 that allows for a reduced running time of the system information block (SIB) scheduling algorithm 122. The system information block (SIB) scheduling module 120 may use the system information block (SIB) extension type lookup table 124 and a bit content to system information block (SIB) extension type mapping 126 to determine the extension type 132 of a system information block (SIB) segment 128 of type 130 extension. In one configuration, the system information block (SIB) scheduling module 120 may include a maxRepInterval 137. The maxRepInterval 137 may be the maximum repetition interval of the system information blocks (SIBs) that are extension type 132. Both the system information block (SIB) extension type lookup table 124 and the bit content to system information block (SIB) extension type mapping 126 are discussed in additional detail below in relation to FIG. 6. The maxRepInterval 137 is discussed in additional detail below in relation to FIG. 8 and FIG. 9.

Figure 2:
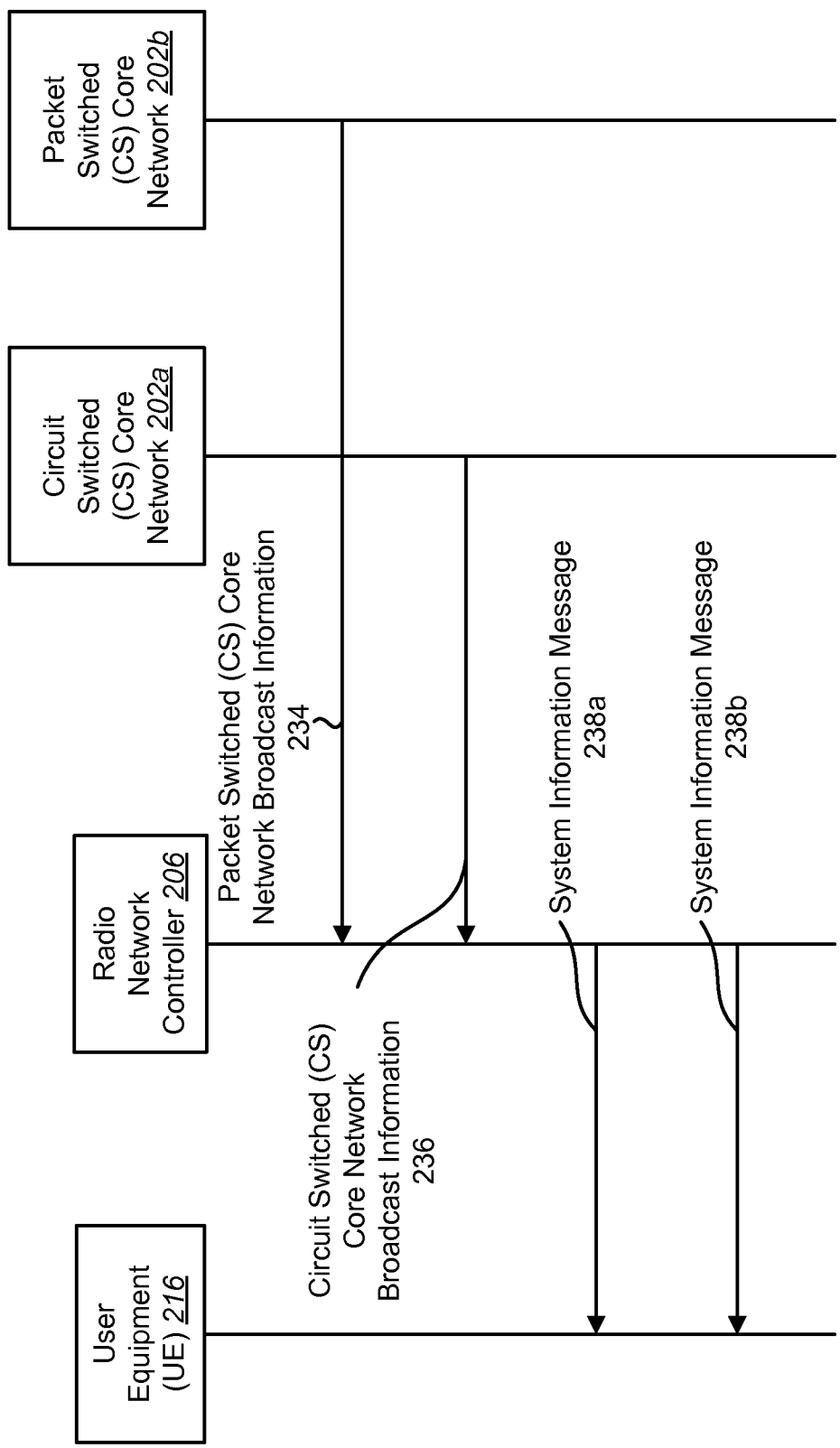
FIG. 2 is a block diagram illustrating system information flows between a user equipment (UE), a radio network controller (RNC), a circuit switched (CS) core network and a packet switched (PS) core network.

FIG. 2 is a block diagram illustrating system information flows between a user equipment (UE) 216, a radio network controller (RNC) 206, a circuit switched (CS) core network 202a and a packet switched (PS) core network 202b. The user equipment (UE) 216 of FIG. 2 may be one configuration of the user equipment (UE) 116 of FIG. 1. The UMTS signaling protocol stack may be divided into an Access Stratum (AS) and a Non-Access Stratum (NAS). The Non-Access Stratum (NAS) architecture may include connection management. The connection management may handle circuit switched calls. The connection management may include sub layers responsible for call control (e.g., establish, release), supplementary services (e.g., call forwarding, three-way calling) and the short message service (SMS).

The Non-Access Stratum (NAS) architecture may also include session management that handles packet switched calls (e.g., establish, release). The Non-Access Stratum (NAS) architecture may further include mobility management that handles location updating and authentication for circuit switched calls. The Non-Access Stratum (NAS) architecture may also include GPRS mobility management that handles location updating and authentication for packet switched calls.

The Access Stratum (NAS) architecture may include the radio resource control (RRC) protocols, radio link control (RLC) protocols, media access control (MAC) protocols and Physical (PHY) layer protocols. The radio resource control (RRC) protocols are defined between a user equipment (UE) 216 and the radio network controller (RNC) 206 to handle the establishment, release and configuration of radio resources. The radio link control (RLC) protocols are defined between the user equipment (UE) 216 and the radio network controller (RNC) 206 to provide segmentation, re-assembly, duplicate detection and other traditional Layer 2 functions. The media access control (MAC) protocols are defined between a user equipment (UE) 216 and the radio network controller (RNC) 206 to multiple user plane and control plane data. The Physical (PHY) layer protocols are defined between a user equipment (UE) 216 and a Node B 104 to transfer data over the radio link. The interface between the user equipment (UE) 216 and the radio network controller (RNC) 206 at the Physical (PHY) layer handles macro diversity combining and splitting functions.

For a user equipment (UE) 216 to access a wireless network, a process called a cell selection procedure is performed. The cell selection procedure is responsible for finding a preferred or best cell to camp on. The cell to be camped on may be determined by Non-Access Stratum (NAS) parameters such as a requested public land mobile network (PLMN) or a forbidden registration area list. The cell to be camped on may also be determined by system information received for the cell that includes the cell barred status, public land mobile network (PLMN), Location Area Identity (LAI) and cell access restrictions.

A radio resource control (RRC) cell selection procedure may be responsible for searching for a cell to camp on when entering radio resource control (RRC) Idle-Disconnected state from a connected state. The radio resource control (RRC) layer in the UTRAN may be responsible for broadcasting system information to all user equipments (UEs) 216. This system information may be broadcast in system information block (SIB) messages that include both Access Stratum (NAS) and Non-Access Stratum (NAS) information elements. The packet switched (PS) core network 202b may send packet switched (PS) core network broadcast information 234 to the radio network controller (RNC) 206. The circuit switched (CS) core network 202a may send circuit switched (CS) core network broadcast information 236 to the radio network controller (RNC) 206. The radio network controller (RNC) 206 may then send system information messages 238a-b to the user equipment (UE) 216.

When a user equipment (UE) 216 first camps on a particular cell, the user equipment (UE) 216 reads system information messages 238 for that cell from the broadcast channel (BCH). The user equipment (UE) 216 may store the system information messages 238 from a given cell so that if the user equipment (UE) 216 changes to another cell and then later returns to the cell, the user equipment (UE) 216 can use the stored system information messages 238 rather than reading them from the broadcast channel (BCH).

Figure 3:
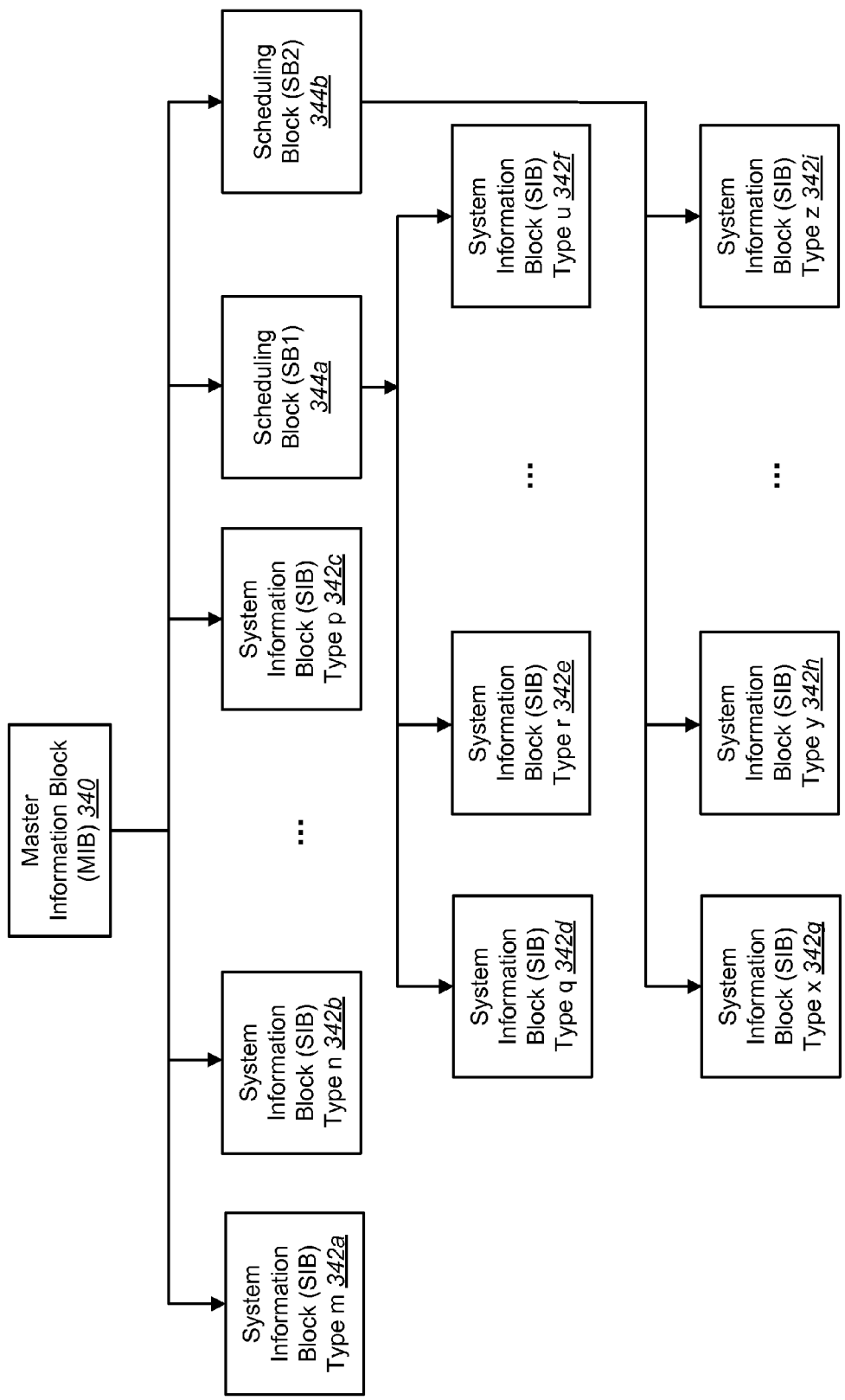
FIG. 3 is a block diagram illustrating a scheduling tree for system information blocks (SIBs)

FIG. 3 is a block diagram illustrating a scheduling tree for system information blocks (SIBs) 342a-i. System information is organized into blocks called system information blocks (SIBs) 342. A system information block (SIB) 342 groups together system information elements of the same nature. Different system information blocks (SIBs) 342 may have different characteristics, such as repetition rate and the instructions for the user equipment (UE) 116 to reread the system information blocks (SIBs) 342.

There may be only one Master Information Block (MIB) 340 that includes scheduling information for the system information blocks (SIBs) 342. The Master Information Block (MIB) 340 may include scheduling information in one or two scheduling blocks (SBs) 344 (i.e., SB1 344a and SB2 344b). The one or two scheduling blocks (SBs) 344 may give scheduling information for additional system information blocks (SIBs) 342.

In the scheduling tree for system information blocks (SIBs) 342 shown, the Master Information Block (MIB) 340 provides scheduling for system information block (SIB) type m 342a, system information block (SIB) type n 342b and other system information block (SIB) 342 types through system information block (SIB) type p 342c. The Master Information Block (MIB) 340 provides scheduling information in a first scheduling block (SB) SB1 344a and a second scheduling block (SB) SB2 344b. The first scheduling block (SB) SB1 344a may then provide scheduling information for system information block (SIB) type q 342d, system information block (SIB) type r 342e and other system information block (SIB) 342 types through system information block (SIB) type u 342f. The second scheduling block (SB) SB2 344b may provide scheduling information for system information block (SIB) type x 342g, system information block (SIB) type y 342h and other system information block (SIB) 342 types through system information block (SIB) type z 342i. A user equipment (UE) 116 may use the scheduling tree for system information blocks (SIBs) 342 to determine the extension type 132 of a system information block (SIB) segment 128. For example, a Master Information Block (MIB) 340 or scheduling block (SB) 344 (SB1 344a or SB2 344b) may indicate to the user equipment (UE) 116 the extension type 132 of a system information block (SIB) segment 128.

Figure 4:
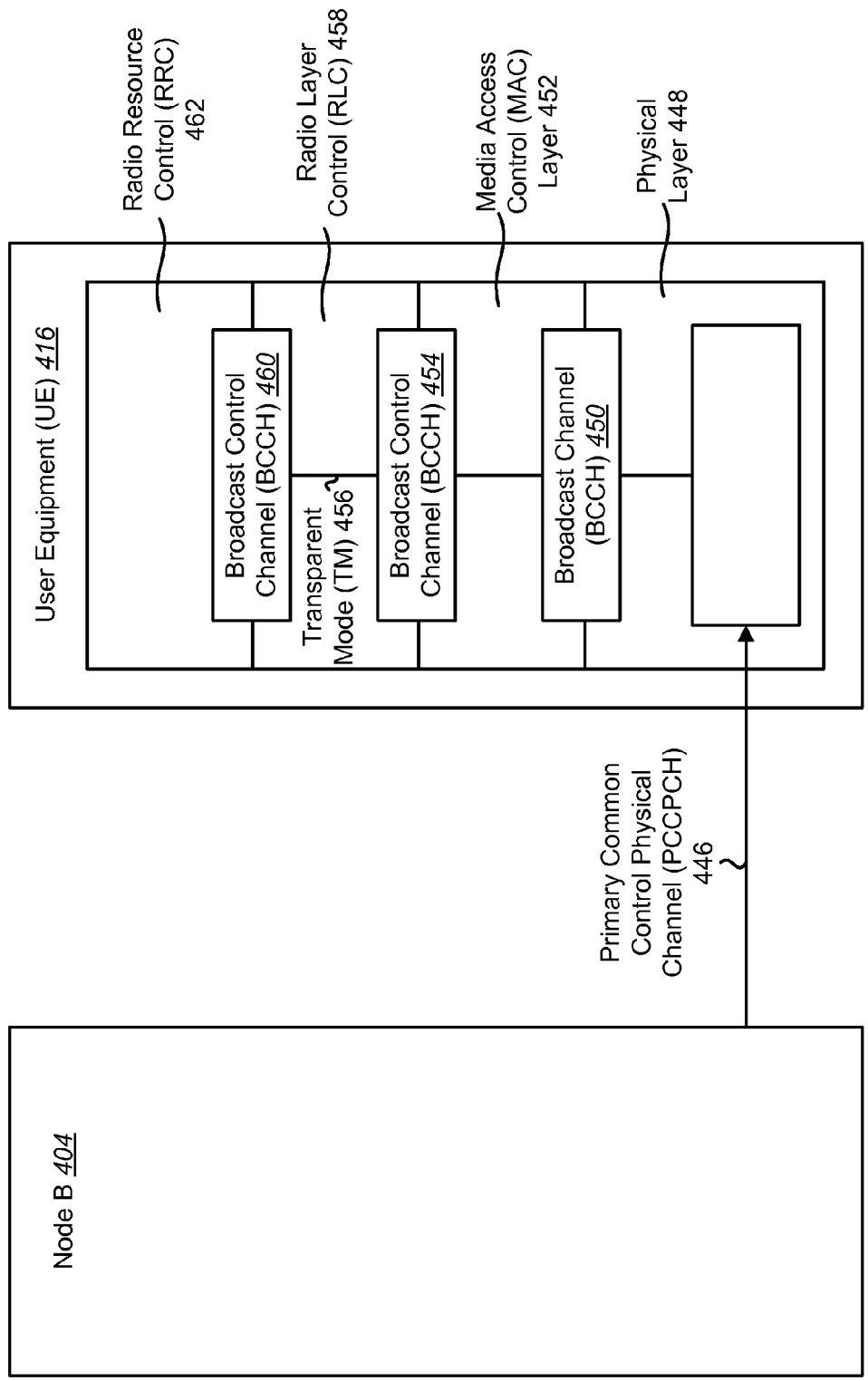
FIG. 4 is a block diagram illustrating transmissions from a Node B to a user equipment (UE)

FIG. 4 is a block diagram illustrating transmissions from a Node B 404 to a user equipment (UE) 416. The Node B 404 of FIG. 4 may be one configuration of the Node Bs 104 of FIG. 1. The user equipment (UE) 416 of FIG. 4 may be one configuration of the user equipment (UE) 116 of FIG. 1. The Node B 404 may communicate with the physical (PHY) layer 448 of the user equipment (UE) 416 using the primary common control physical channel (PCCPCH) 446. The Master Information Block (MIB) 340, scheduling blocks (SBs) 344 and all of the system information blocks (SIBs) 342 are transmitted in a set of system information messages that are sent on the primary common control physical channel (PCCPCH) 446. Then, the system information blocks (SIBs) 342 can be sent to the radio resource control (RRC) layer 462 through the pipe shown from the physical (PHY) layer 448 to the media access control (MAC) layer 452 via the broadcast channel (BCH) 450, from the media access control (MAC) layer 452 to the radio link control (RLC) layer 458 via the broadcast control channel (BCCH) 454 and from the radio link control (RLC) layer 458 to the radio resource control (RRC) layer 462 via a transparent mode (TM) 456 and the broadcast control channel (BCCH) 460.

Figure 5:
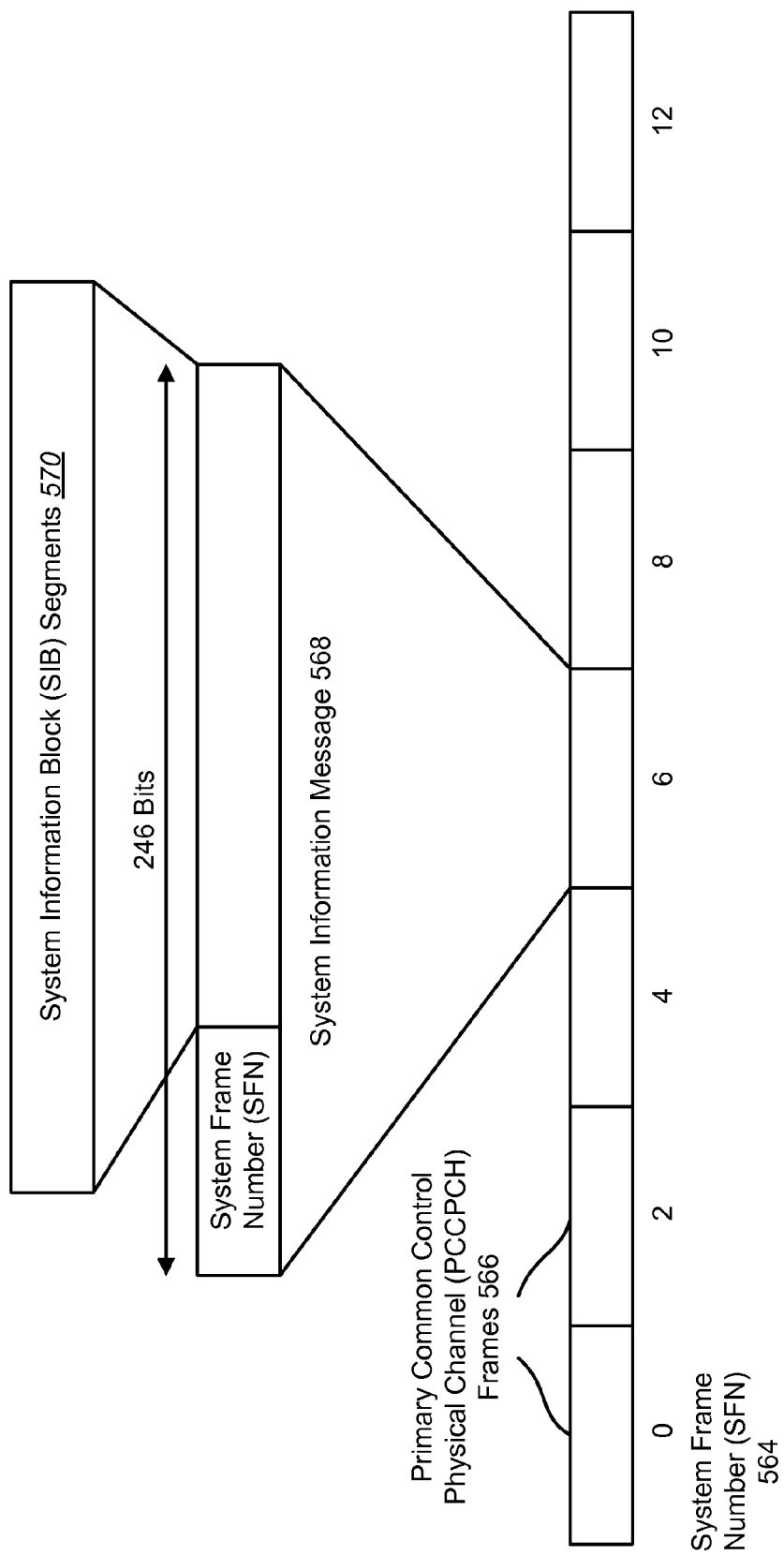
FIG. 5 is a block diagram illustrating the structure of a system information message.

FIG. 5 is a block diagram illustrating the structure of a system information message 568. Every 20 milliseconds (ms), a system information message 568 is broadcast on the primary common control physical channel (PCCPCH) 446 with a BCCH-BCH container using primary common control physical channel (PCCPCH) frames 566. As used herein, a BCCH-BCH container is a container that can carry system information blocks. The system information message 568 encapsulates and segments the Master Information Block (MIB) 340, scheduling blocks (SBs) 344 and the system information block (SIB) segments 570. The system information message 568 may include the System Frame Number (SFN) 564. The transmitted System Frame Number (SFN) 564 is even because the system information message 568 is transmitted every 20 ms while the System Frame Number (SFN) 564 increments every 10 ms.

The system information message 568 may include one of eleven possible segment types: 1. No segment, 2. First segment, 3. Subsequent segment, 4. Last segment, 5. Last segment plus first segment, 6. Last segment plus complete segment list, 7. Last segment plus complete segment list plus first segment, 8. Complete segment list, 9. Complete segment list plus first segment, 10. Complete segment of size 215 to 226 or 11. Last segment of size 215 to 222. There may be gaps between the system information blocks (SIBs) 342. The system information blocks (SIBs) 342 may not necessarily follow each other in consecutive primary common control physical channel (PCCPCH) frames 566.

Scheduling of system information blocks (SIBs) 342 may be performed by the radio resource control (RRC) layer 462 in UTRAN. If segmentation is used, it may be possible to schedule each system information block (SIB) segment 128 separately. Scheduling is a way for a user equipment (UE) 116 to identify which system information block (SIB) 342 is coming on which System Frame Number (SFN) 564. To allow the mixing of system information blocks (SIBs) 342 with a short repetition period and system information blocks (SIBs) 342 with segmentation over many frames, the UTRAN may multiplex segments from different system information blocks (SIBs) 342. Multiplexing and de-multiplexing may be performed by the radio resource control (RRC) layer 462.

The scheduling of each system information block (SIB) 342 broadcast on a broadcast channel (BCH) transport channel may be defined by the number of segments (SEG_COUNT), the repetition period (SIB_REP) (the same value applies to all segments), the position (phase) of the first segment within one cycle of the Cell System Frame Number 564 (SIB_POS(0)) and the offset of the subsequent segments in ascending index order (SIB_OFF(i), i=1, 2, . . . SEG_COUNT−1). Since system information blocks (SIBs) 342 are repeated with a period of SIB_REP, the value of SIB_POS(i), i=0, 1, 2, . . . SEG_COUNT−1 is be less than SIB_REP for all segments. The position of the subsequent segments may be calculated as SIB_POS(i)=SIB_POS(i−1)+SIB_OFF(i).

The scheduling is based on the Cell System Frame Number (SFN) 564. The System Frame Number (SFN) 564 of a frame at which a particular segment i (with i=0, 1, 2, . . . SEG_COUNT−1) of a system information block (SIB) 342 occurs fulfills Equation (1):

$$\text{SFN mod SIB\_REP} = \text{SIB\_POS}(i). \quad (1)$$

If a system information block (SIB) segment 128 fails to pass the relationship in Equation (1), the user equipment (UE) 116 may discard this system information block (SIB) segment 128.

The BCCH-BCH container may include the System Frame Number (SFN) prime, the type 130, the segment type and the data using one of the combinations from 1 to 11. As used herein, System Frame Number (SFN) prime refers to the System Frame Number (SFN) multiplied by 2. The system information block (SIB) type 130 is only capable of indicating a type from 1 to 31. For legacy system information blocks (SIBs) 342, a user equipment (UE) 116 can get scheduling information based on the system information block (SIB) type 130 directly (i.e., a one-to-one mapping). For example, if a BCCH-BCH container has system information block (SIB) type 130 as Master Information Block (MIB) 340, then the system information block (SIB) 342 maps directly to the Master Information Block (MIB) 340.

However, over time additional system information block (SIB) types 130 have become necessary. These additional system information block (SIB) types 130 are referred to as extension types 132. An extension type 132 has a system information block (SIB) type 130 of 31 (i.e., extension). Extension type 132 scheduling is discussed in additional detail below in relation to FIG. 6.

Figure 6:
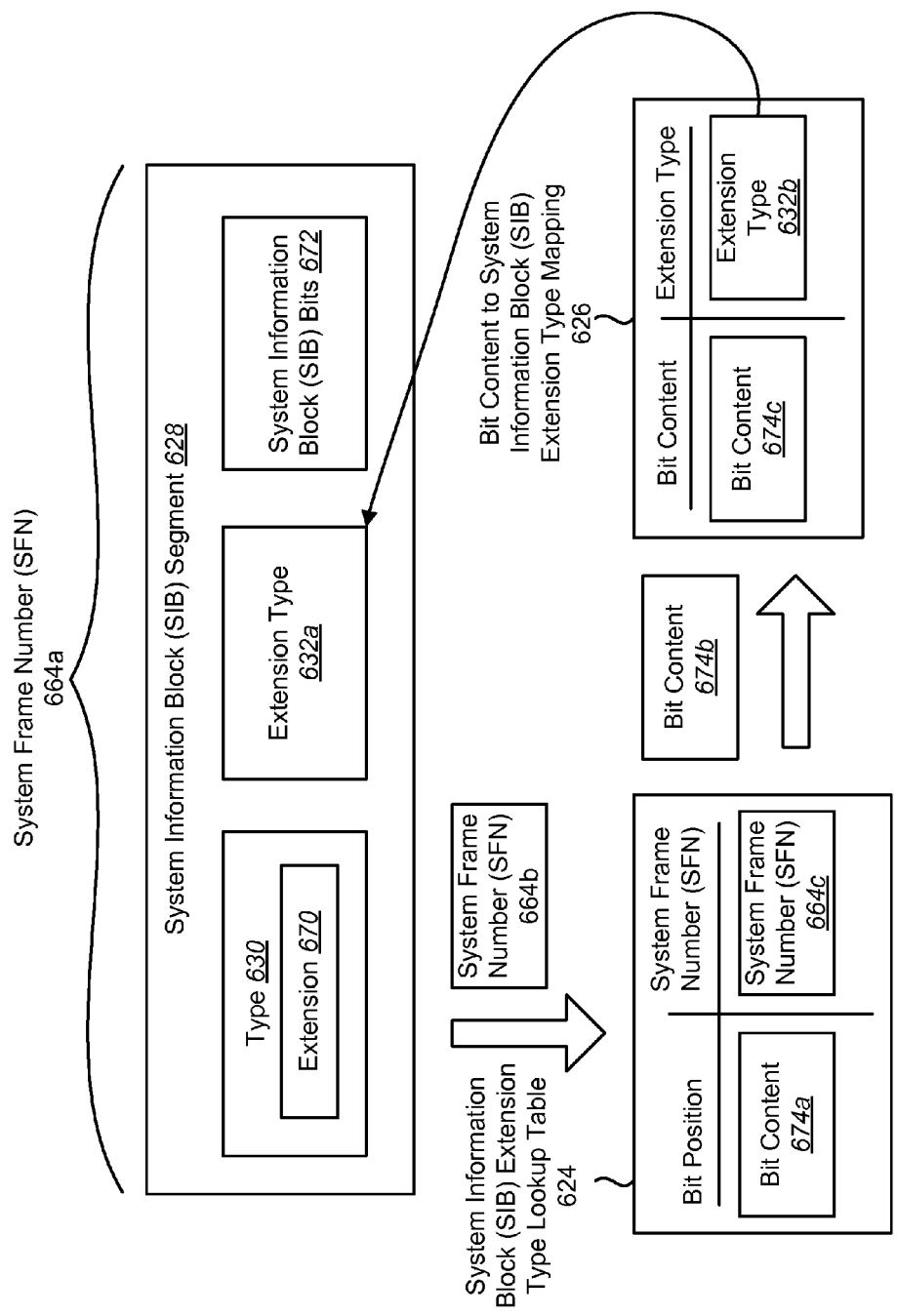
FIG. 6 is a block diagram illustrating the use of a scheduling system information block (SIB) extension type table and a bit content to system information block (SIB) extension type mapping to determine the extension type of a system information block (SIB) segment.

FIG. 6 is a block diagram illustrating the use of a scheduling system information block (SIB) extension type table 624 and a bit content to system information block (SIB) extension type mapping 626 to determine the extension type 632*a-b* of a system information block (SIB) segment 628. A user equipment (UE) 116 may receive a system information block (SIB) segment 628. The system information block (SIB) segment 628 may be received during a System Frame Number (SFN) 664*a*. The system information block (SIB) segment 628 may include a type 630 that is set to extension 670. The system information block (SIB) segment 628 may also include an extension type 632*a*. The system information block (SIB) segment 628 may further include system information block (SIB) bits 672.

To determine the extension type 632*a* of a system information block (SIB) segment 628, the user equipment (UE) 116 may use a system information block (SIB) extension type lookup table 624. The user equipment (UE) 116 may plug the System Frame Number (SFN) 664*b* of the system information block (SIB) segment 628 into the system information block (SIB) extension type lookup table 624 and find the bit content 674*a* for the bit position corresponding to the System Frame Number (SFN) 664*c*. The user equipment (UE) 116 may use the bit content 674*b* in a bit content to system information block (SIB) extension type mapping 626. The user equipment (UE) 116 may find the extension type 632*b* corresponding to the bit content 674*c* in the bit content to system information block (SIB) extension type mapping 626. The extension type 632*b* in the bit content to system information block (SIB) extension type mapping 626 may be the extension type 632*a* of the system information block (SIB) segment 628.

Figure 7:
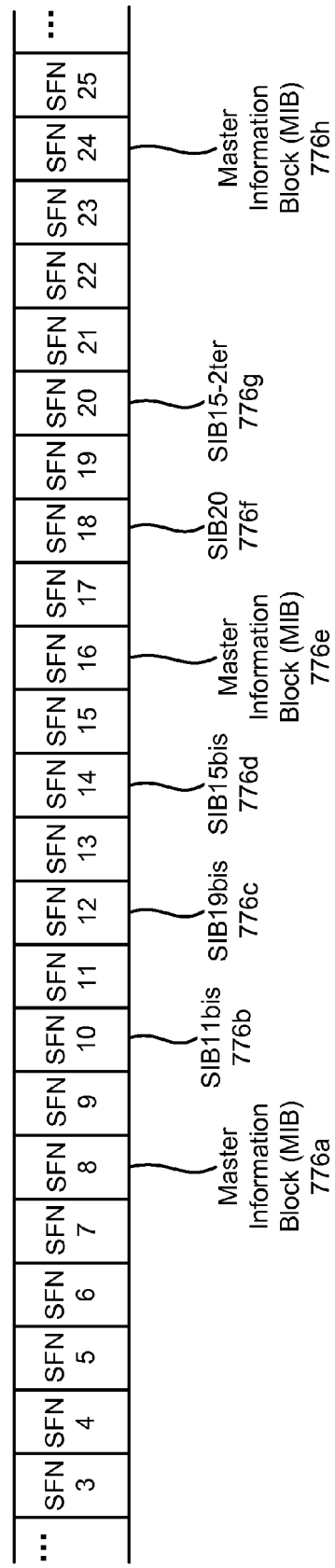
FIG. 7 is a block diagram illustrating extension type system information block (SIB) scheduling.

FIG. 7 is a block diagram illustrating extension type 132 system information block (SIB) 342 scheduling. In extension type 132 system information block (SIB) 342 scheduling, the system information block (SIB) type 130 is extension 670 (i.e., SIB type 31) that allows a one-to-many mapping of the type 130 to different extension types 132. There are 11 extension types 132: 1. systemInfoType11bis, 2. systemInfoType15bis, 3. systemInfoType15-1bis, 4. systemInfoType15-2bis, 5. systemInfoType15-3bis, 6. systemInfoType15-6, 7. systemInfoType15-7, 8. systemInfoType15-8, 9. systemInfoType19, 10. systemInfoType15-2ter and 11. systemInfoType20. A system information block (SIB) segment 128 with a type 130 that is extension 670 may map to any of the 11 extension types 132.

The extension type 132 for a system information block (SIB) segment 128 may be indicated only in the scheduling information in the Master Information Block (MIB) 340 or scheduling block (SB) 344. Each segment in SYSTEM INFORMATION for SIB11bis only indicates the system information block (SIB) type 130 extension type 132 but does not provide specifically which system information block (SIB) type 130. Typically, the user equipment (UE) 116 relies on the position (in terms of the broadcast channel (BCH) transmission time interval (TTI)) of the segments in identifying particular segments with extension type 132 corresponding to SIB 11bis.

A system information block (SIB) reception architecture of the user equipment (UE) 116 carries out a targeted reception of system information blocks (SIBs) 342 based on the information provided in the scheduling information. The user equipment (UE) 116 may use a system information block (SIB) scheduling module 120 with a system information block (SIB) scheduling algorithm 122 on every BCCH-BCH system information block (SIB) segment 128 of type 130 extension 670. There are currently 11 different extension types 132 (although in the future, there may be more). Each extension type 132 may have 16 segments. Assuming that the system information block (SIB) scheduling algorithm 122 is not optimized, the system information block (SIB) scheduling algorithm 122 can potentially run many times.

For example, the user equipment (UE) 116 may internally bookmark a system information block (SIB) segment 128 of extension type 132 as received once it is received and decoded successfully. Henceforth, the user equipment (UE) 116 does not consider this extension type 132 while running the system information block (SIB) scheduling algorithm 122. If the system information block (SIB) scheduling algorithm 122 is first run for extension type 1, then run for extension type 2 and so on, for the best case scenario (i.e., when the user equipment (UE) 116 receives a segment of extension type 1 (i.e., SIB11bis) first, followed by receiving a segment of extension type 2 (i.e., SIB15bis) and so on), the system information block (SIB) scheduling algorithm may be run 11*16=176 times. For the worst case scenario (i.e., when the user equipment (UE) 116 receives a segment of extension type 11 (i.e., SIB20) first, followed by receiving a segment of extension type 10 (i.e., SIB15-2ter) and so on), the system information block (SIB) scheduling algorithm 122 may be run (1+2+3+4+5+6+7+8+9+10+11)*16=1056 times, assuming that system information block (SIB) 342 decoding does not fail.

Different MIBs/SIBs may be received for each System Frame Number (SFN). In the example shown in FIG. 7, a Master Information Block (MIB) 776*a* uses SFN 8 and SFN 9. The Master Information Block (MIB) 776*a* is followed by a system information block (SIB) segment 128 of extension type 1 (i.e., SIB11bis 776*b*) in SFN 10 and SFN 11. A system information block (SIB) segment 128 of extension type 9 (i.e., SIB19bis 776*c*) is in SFN 12 and SFN 13. A system information block (SIB) segment 128 of extension type 2 (i.e., SIB15bis 776*d*) is in SFN 14 and SFN 15. A Master Information Block (MIB) 776*e* uses SFN 16 and SFN 17. A system information block (SIB) segment 128 of extension type 11 (i.e., SIB20 776*f*) uses SFN 18 and SFN 19. A system information block (SIB) segment 128 of extension type 10 (i.e., SIB15-2ter 776*g*) uses SFN 20, SFN 21, SFN 22 and SFN 23. A Master Information Block (MIB) 776*h* uses SFN 24 and SFN 25.

Figure 8:
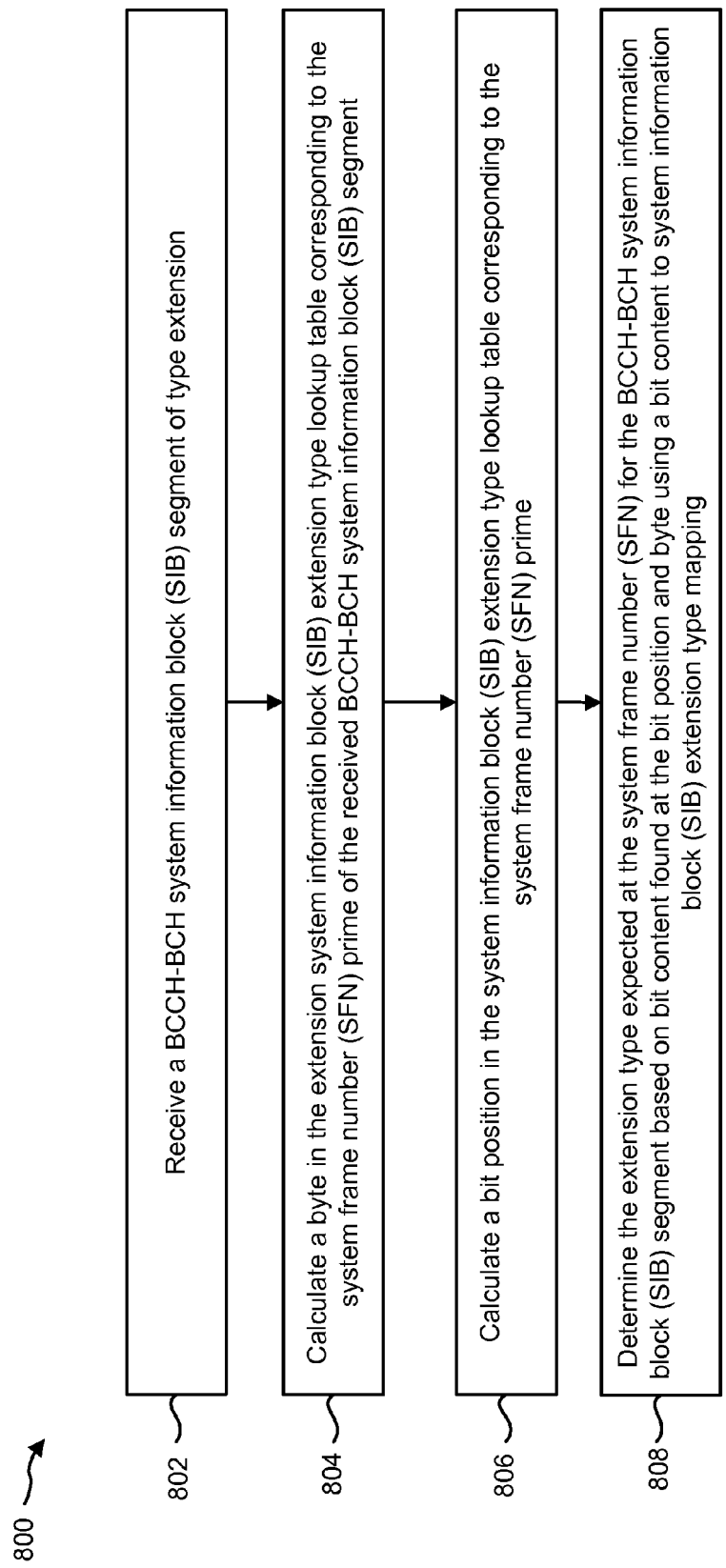
FIG. 8 is a flow diagram of a method for determining an extension type of a system information block (SIB) segment.

FIG. 8 is a flow diagram of a method 800 for determining an extension type 132 of a system information block (SIB) segment 128. The method 800 may be performed by a user equipment (UE) 116. The user equipment (UE) 116 may receive 802 a BCCH-BCH system information block (SIB) segment 128 of type 130 extension 670. A system information block (SIB) segment 128 of type 130 extension 670 is a system information block (SIB) segment 128 with type 130 extension 670 (i.e., SIB type 31) indicating that one of the extension types 132 is used for the system information block (SIB) segment 128.

The user equipment (UE) 116 may calculate 804 the byte in a system information block (SIB) extension type lookup table 124 corresponding to the System Frame Number (SFN) 564 prime of the received BCCH-BCH system information block (SIB) segment 128. The system information block (SIB) extension type lookup table 124 may be a table with 1024 bytes maintained by the user equipment (UE) 116. Every four bits of each byte may correspond to a System Frame Number (SFN) 564 prime. For example, bits 0, 1, 2 and 3 of the first byte (byte 1) may map to SFN prime 0 and bits 4, 5, 6 and 7 of the first byte (byte 1) may map to SFN prime 1. The system information block (SIB) extension type lookup table 124 limits the extension types 132 that are used in the system information block (SIB) scheduling algorithm 122. The initialization of the system information block (SIB) extension type lookup table 124 is discussed below in relation to FIG. 9. The bit positions and bytes for different System Frame Number (SFN) 564 primes in a system information block (SIB) extension type lookup table 124 are illustrated in Table 1 below.

TABLE 1

| Bit positions | 0 1 2 3 | 4 5 6 7 |
|---|---|---|
| Byte 1 | SFN prime 0 | SFN prime 1 |
| Byte 2 | SFN prime 2 | SFN prime 3 |
| . | . | . |
| . | . | . |
| . | . | . |
| Byte 1024 | SFN prime 2047 | SFN prime 2048 |

The user equipment (UE) 116 may calculate 804 the byte in the system information block (SIB) extension type lookup table 124 according to the System Frame Number (SFN) 564 prime of the received system information block (SIB) segment 128 using Equation (2):

$$\text{Byte index} = \text{SFN prime} \gg 1. \quad (2)$$

In Equation (2), ">>1" means a right shift by 1. The user equipment (UE) 116 may calculate 806 a bit position in the system information block (SIB) extension type lookup table 124 corresponding to the System Frame Number (SFN) 564 prime using Equation (3):

$$\text{Bit position} = \text{SFN prime} \,\&\, 0x1. \quad (3)$$

Based on the bit content 674 found at the bit position and byte of the system information block (SIB) extension type lookup table 124, the user equipment (UE) 116 may determine 808 the system information block (SIB) extension type 132 using a bit content to system information block (SIB) extension type mapping 126. The bit content to system information block (SIB) extension type mapping 126 is illustrated in Table 2 below.

TABLE 2

| Bit content | Extension type |
|---|---|
| 0001 | SIB11bis |
| 0010 | SIB15bis |
| 0011 | SIB15-1bis |
| 0100 | SIB15-2bis |
| 0101 | SIB15-3bis |
| 0110 | SIB15-6 |
| 0111 | SIB15-7 |

TABLE 2-continued

| Bit content | Extension type |
|---|---|
| 1000 | SIB15-8 |
| 1001 | SIB19 |
| 1010 | SIB15-2ter |
| 1011 | SIB20 |

One benefit of determining the extension type 132 using the method 800 is that the system information block (SIB) scheduling algorithm 122 does not need to be computed iteratively. Also, the operations involved to derive the extension type 132 are simple bitwise operations with no conditional branching. The million instructions per second (MIPS) consumed for receiving and decoding the system information block (SIB) segments 128 of type 130 extension 670 may be lower (i.e., reduced) using the method 800 than using the system information block (SIB) scheduling algorithm 122 iteratively.

In one configuration, a reduced memory system information block (SIB) extension type lookup table 124 may be used to determine extension types 132. The size of the reduced memory system information block (SIB) extension type lookup table 124 may be limited based upon repeat intervals of the extension types 132. In the reduced memory system information block (SIB) extension type lookup table 124, only the System Frame Number (SFN) 564 primes in the range 0 to maxRepInterval−1 may be filled. The interval maxRepInterval 137 is the maximum repetition interval of the system information blocks (SIBs) 342 that are extension type 132, in terms of the number of System Frame Numbers (SFNs) 564. The size of the reduced memory system information block (SIB) extension type lookup table 124 may be maxRepInterval*4/8 bytes.

Calculating a byte in the reduced memory system information block (SIB) extension type lookup table 124 corresponding to the System Frame Number (SFN) 564 prime of the received BCCH-BCH system information block (SIB) segment 128 may use Equation (4):

$$\text{Byte index} = (\text{SFN prime} \,\&\, (\text{maxRepInterval}-1)2) \gg 1. \quad (4)$$

In Equation (4), (maxRepInterval−1) is multiplied by 2. Also, in Equation (4), ">>1" refers to a shift to the right by 1. In practical networks, the value of maxRepInterval 137 may be 128. Equation (4) may then be rewritten as Equation (5):

$$\text{Byte index} = (\text{SFN prime} \,\&\, (0x7F)) \gg 1. \quad (5)$$

Calculating a bit position in the reduced memory system information block (SIB) extension type lookup table 124 corresponding to the System Frame Number (SFN) 564 prime may use Equation (3) above. By checking the entry at the bit position computed using Equation (5) and Equation (3), the user equipment (UE) 116 may determine the extension type 132 expected at the System Frame Number (SFN) 564 for the BCCH-BCH system information block (SIB) segment. The number of MIPS consumed when using a reduced memory system information block (SIB) extension type lookup table 124 may be less than using the system information block (SIB) scheduling algorithm 122 iteratively. If maxRepInterval 137 is 128, the table size in the reduced memory system information block (SIB) extension type lookup table 124 may be only 64 bytes.

Figure 9:
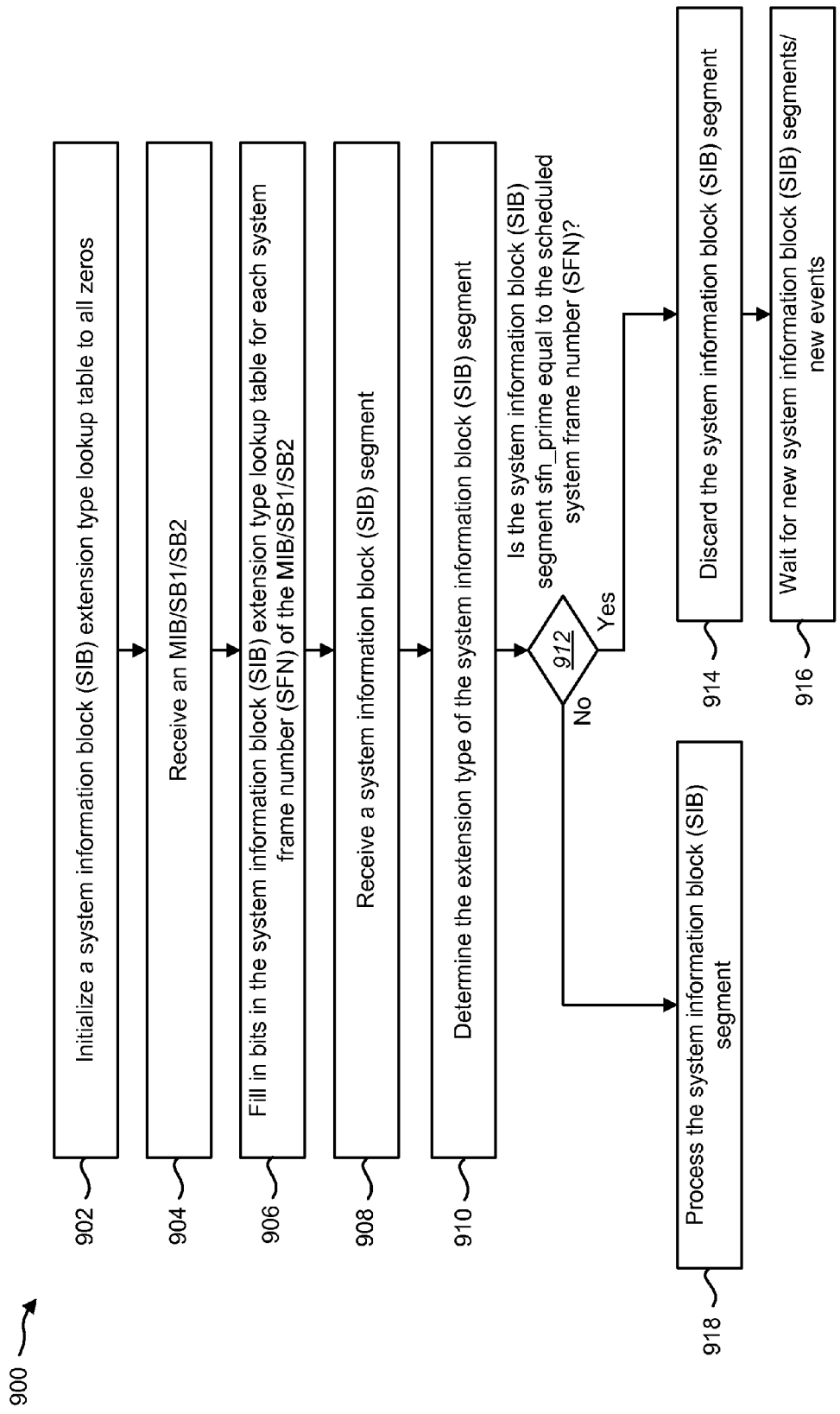
FIG. 9 is a flow diagram of another method for determining an extension type of a system information block (SIB) segment.

FIG. 9 is a flow diagram of another method 900 for determining an extension type 132 of a system information block (SIB) segment 128. The method 900 may be performed by a user equipment (UE) 116. The user equipment (UE) 116 may initialize 902 a system information block (SIB) extension type lookup table 124 to all zeroes. In one configuration, the system information block (SIB) extension type lookup table 124 may be a reduced memory system information block (SIB) extension type lookup table 124. The user equipment (UE) 116 may receive 904 an MIB/SB1/SB2. The user equipment (UE) 116 may then fill in 906 the bits in the system information block (SIB) extension type lookup table 124 for each System Frame Number (SFN) 564 prime according to Table 1 above. For example, for SIB11bis, the bit content 0001 may be filled in the System Frame Number (SFN) 564 primes in which SIB11bis is scheduled as per the information indicated in MIB/SB1/SB2. If the system information block (SIB) extension type lookup table 124 is a reduced memory system information block (SIB) extension type lookup table 124, the contents of the reduced memory system information block (SIB) extension type lookup table 124 may only be filled for System Frame Number (SFN) primes 564 in the range 0 to maxRepInterval−1.

The user equipment (UE) 116 may receive 908 a system information block (SIB) segment 128 of type 130 extension 670. The user equipment (UE) 116 may determine 910 the extension type 132 of the system information block (SIB) segment 128 of type 130 extension 670. The user equipment (UE) 116 may then determine 912 whether the system information block (SIB) segment sfn_prime is equal to the scheduled System Frame Number (SFN) 564. If the system information block (SIB) 342 sfn_prime is not equal to the scheduled System Frame Number (SFN) 564, the user equipment (UE) 116 may discard 914 the system information block (SIB) segment 128 of type 130 extension 670 and wait 916 for new system information block (SIB) segments 128/new events.

If the system information block (SIB) 342 sfn_prime (i.e., the System Frame Number (SFN) prime) is equal to the scheduled System Frame Number (SFN) 564, the user equipment (UE) 116 may process 918 the system information block (SIB) segment 128 of type 130 extension 670. Processing 918 the system information block (SIB) segment 128 refers to running the system information block (SIB) scheduling algorithms discussed above in relation to FIGS. 2-5.

Figure 10:
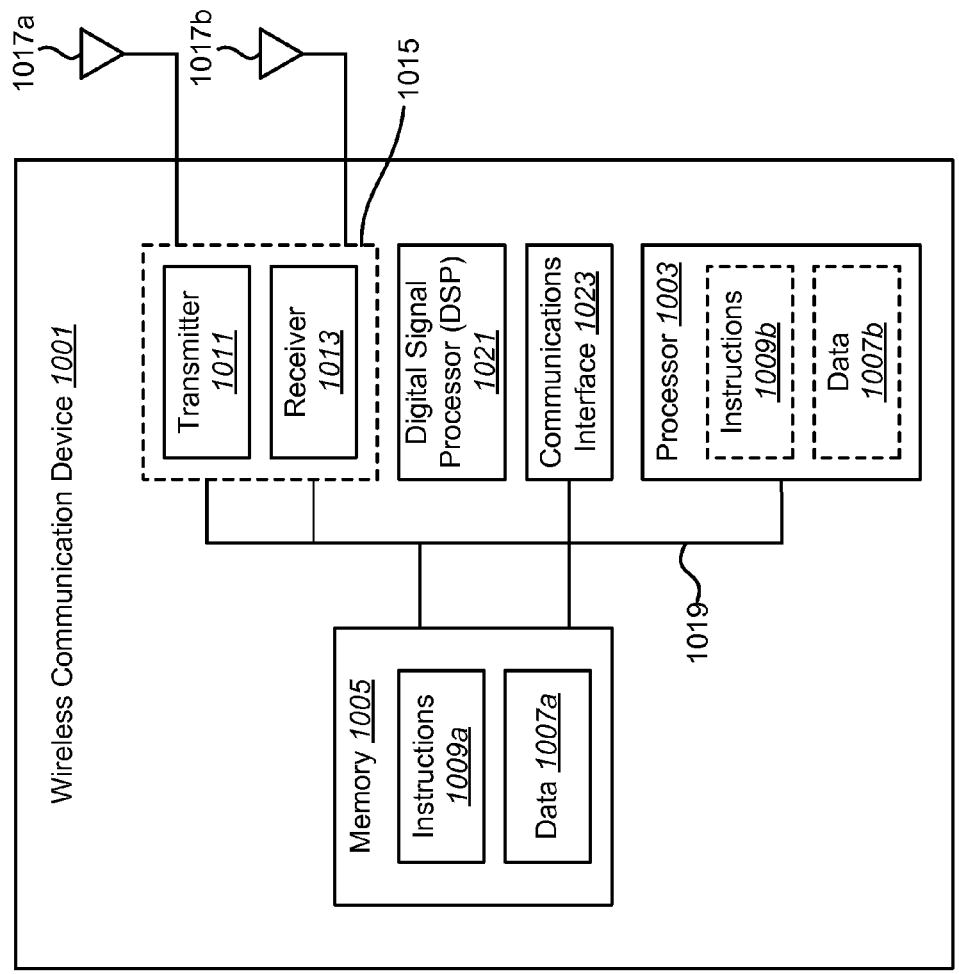
FIG. 10 illustrates certain components that may be included within a wireless communication device.

FIG. 10 illustrates certain components that may be included within a wireless communication device 1001. A wireless communication device 1001 may also be referred to as, and may include some or all of the functionality of, a terminal, an access terminal, a subscriber unit, a station, a user equipment (UE) 116, etc. The wireless communication device 1001 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1001 of FIG. 10, in an alternative configuration, a combination of processors (e.g., an ARM and DSP) could be used.

The wireless communication device 1001 also includes memory 1005. The memory 1005 may be any electronic component capable of storing electronic information. The memory 1005 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1007*a* and instructions 1009*a* may be stored in the memory 1005. The instructions 1009*a* may be executable by the processor 1003 to implement the methods disclosed herein. Executing the instructions 1009*a* may involve the use of the data 1007*a* that is stored in the memory 1005. When the processor 1003 executes the instructions 1009*a*, various portions of the instructions 1009*b* may be loaded onto the processor 1003, and various pieces of data 1007*b* may be loaded onto the processor 1003.

The wireless communication device 1001 may also include a transmitter 1011 and a receiver 1013 to allow transmission and reception of signals to and from the wireless communication device 1001. The transmitter 1011 and receiver 1013 may be collectively referred to as a transceiver 1015. Multiple antennas 1017*a-b* may be electrically coupled to the transceiver 1015. The wireless communication device 1001 may also include (not shown) multiple transmitters, multiple receivers, multiple transceivers and/or additional antennas.

The wireless communication device 1001 may include a digital signal processor (DSP) 1021. The wireless communication device 1001 may also include a communications interface 1023. The communications interface 1023 may allow a user to interact with the wireless communication device 1001.

The various components of the wireless communication device 1001 may be coupled together by one or more buses, which may include a power bus, a control signal bus, a status signal bus, a data bus, etc. For simplicity, the various buses are illustrated in FIG. 10 as a bus system 1019.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

Further, it should be appreciated that modules and/or other appropriate means for performing the methods and techniques described herein, such as those illustrated by FIG. 8 and FIG. 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for determining an extension type of a system information block segment, comprising:
   receiving, from a Node B, a system information block segment of type extension in a system frame number at a user equipment;
   calculating, at the user equipment, a byte in a system information block extension type lookup table corresponding to the system frame number of the system information block segment;
   calculating, at the user equipment, a bit position in the system information block extension type lookup table corresponding to the system frame number; and
   determining, at the user equipment, the extension type expected at the system frame number for the system information block segment using the byte and the bit position.

2. The method of claim 1, wherein bit content corresponds to the byte and the bit position, and wherein determining the extension type expected using the byte and the bit position comprises determining the extension type corresponding to the bit content in a bit content to system information block extension type mapping.

3. The method of claim 1, further comprising:
   initializing the system information block extension type lookup table to all zeroes;
   receiving scheduling information; and
   filling in bits in the system information block extension type lookup table for each system frame number of the scheduling information.

4. The method of claim 3, wherein the scheduling information is one of a master information block and a scheduling block.

5. The method of claim 3, wherein the system information block extension type lookup table is a reduced memory system information block extension type lookup table, and wherein only bits in the reduced memory system information block extension type lookup table for system frame numbers in the range 0 to maxRepinterval−1 are filled.

6. The method of claim 1, wherein the method is performed by a user equipment.

7. The method of claim 6, wherein the user equipment (UE) operates in an Evolved High-Speed Packet Access environment.

8. The method of claim 1, wherein the system information block segment is a broadcast control channel-broadcast channel system information block segment.

9. The method of claim 1, wherein the method reduces the time used to process the system information block of type extension.

10. The method of claim 1, wherein the method reduces the million instructions per second used to process the system information block of type extension.

11. The method of claim 1, further comprising determining whether a sfn_prime of the system information block segment is equal to a scheduled system frame number.

12. The method of claim 11, wherein the sfn_prime of the system information block segment is equal to the scheduled system frame number, and further comprising processing the system information block segment.

13. The method of claim 11, wherein the sfn_prime of the system information block segment is not equal to the scheduled system frame number, and further comprising:
   discarding the system information block segment; and
   waiting for a new system information block segment.

14. A wireless device configured for determining an extension type of a system information block segment, comprising:
a processor;
memory in electronic communication with the processor;
instructions stored in the memory, the instructions being executable by the processor to:
receive a system information block segment of type extension in a system frame number;
calculate a byte in a system information block extension type lookup table corresponding to the system frame number of the system information block segment;
calculate a bit position in the system information block extension type lookup table corresponding to the system frame number; and
determine the extension type expected at the system frame number for the system information block segment using the byte and the bit position.

15. The wireless device of claim 14, wherein bit content corresponds to the byte and the bit position, and wherein the instructions executable to determine the extension type expected using the byte and the bit position comprise instructions executable to determine the extension type corresponding to the bit content in a bit content to system information block extension type mapping.

16. The wireless device of claim 14, wherein the instructions are further executable to:
initialize the system information block extension type lookup table to all zeroes;
receive scheduling information; and
fill in bits in the system information block extension type lookup table for each system frame number of the scheduling information.

17. The wireless device of claim 16, wherein the scheduling information is one of a master information block and a scheduling block.

18. The wireless device of claim 16, wherein the system information block extension type lookup table is a reduced memory system information block extension type lookup table, and wherein only bits in the reduced memory system information block extension type lookup table for system frame numbers in the range 0 to maxRepinterval−1 are filled.

19. The wireless device of claim 14, wherein the wireless device is a user equipment.

20. The wireless device of claim 19, wherein the user equipment (UE) operates in an Evolved High-Speed Packet Access environment.

21. The wireless device of claim 14, wherein the system information block segment is a broadcast control channel-broadcast channel system information block segment.

22. The wireless device of claim 14, wherein the wireless device uses a reduced time to process the system information block of type extension.

23. The wireless device of claim 14, wherein the method uses a reduced million instructions per second to process the system information block of type extension.

24. The wireless device of claim 14, wherein the instructions are further executable to determine whether a sfn_prime of the system information block segment is equal to a scheduled system frame number.

25. The wireless device of claim 24, wherein the sfn_prime of the system information block segment is equal to the scheduled system frame number, and wherein the instructions are further executable to process the system information block segment.

26. The wireless device of claim 24, wherein the sfn_prime of the system information block segment is not equal to the scheduled system frame number, and wherein the instructions are further executable to:
discard the system information block segment; and
wait for a new system information block segment.

27. A wireless device configured for determining an extension type of a system information block segment, comprising:
means for receiving a system information block segment of type extension in a system frame number;
means for calculating a byte in a system information block extension type lookup table corresponding to the system frame number of the system information block segment;
means for calculating a bit position in the system information block extension type lookup table corresponding to the system frame number; and
means for determining the extension type expected at the system frame number for the system information block segment using the byte and the bit position.

28. The wireless device of claim 27, wherein bit content corresponds to the byte and the bit position, and wherein the means for determining the extension type expected using the byte and the bit position comprises means for determining the extension type corresponding to the bit content in a bit content to system information block extension type mapping.

29. The wireless device of claim 27, further comprising:
means for initializing the system information block extension type lookup table to all zeroes;
means for receiving a scheduling block; and
means for filling in bits in the system information block extension type lookup table for each system frame number of the scheduling block.

30. A computer-program product for determining an extension type of a system information block segment, the computer-program product comprising a non-transitory computer-readable medium having computer-readable instructions encoded thereon, where the computer-readable instructions when executed by a computer cause the computer to:
causing a user equipment to receive a system information block segment of type extension in a system frame number;
causing the user equipment to calculate a byte in a system information block extension type lookup table corresponding to the system frame number of the system information block segment;
causing the user equipment to calculate a bit position in the system information block extension type lookup table corresponding to the system frame number; and
causing the user equipment to determine the extension type expected at the system frame number for the system information block segment using the byte and the bit position.

31. The computer-program product of claim 30, wherein bit content corresponds to the byte and the bit position, and wherein the causing the user equipment to determine the extension type expected using the byte and the bit position comprises causing the user equipment to determine the extension type corresponding to the bit content in a bit content to system information block extension type mapping.

32. The computer-program product of claim 30, wherein the instruction further comprise:
causing the user equipment to initialize the system information block extension type lookup table to all zeroes;
causing the user equipment to receive a scheduling block; and causing the user equipment to fill in bits in the system information block extension type lookup table for each system frame number of the scheduling block.

* * * * *